United States Patent [19]

Kameda

[11] Patent Number: 5,033,007
[45] Date of Patent: Jul. 16, 1991

[54] APPARATUS FOR PROCESSING CONTINUOUSLY INPUTTED PICTURE DATA STRINGS

[75] Inventor: Keiichi Kameda, Kyoto, Japan

[73] Assignee: Matsushita Electric Industrial Co., Ltd., Osaka, Japan

[21] Appl. No.: 274,812

[22] Filed: Nov. 23, 1988

[30] Foreign Application Priority Data

Nov. 30, 1987 [JP] Japan ............................. 62-302238
Dec. 10, 1987 [JP] Japan ............................. 62-312762

[51] Int. Cl.⁵ .......................................... G06F 15/20
[52] U.S. Cl. .................................... 364/518; 358/136; 340/721; 364/521
[58] Field of Search ................ 364/518, 521; 340/709, 340/721, 723, 724, 729; 358/136

[56] References Cited

U.S. PATENT DOCUMENTS

| | | | |
|---|---|---|---|
| 4,006,297 | 2/1977 | Koga | 358/136 |
| 4,319,331 | 3/1982 | Elbaum et al. | 364/518 |
| 4,677,575 | 6/1987 | Redin | 364/521 |
| 4,733,248 | 3/1988 | Hibino | 346/33 R |
| 4,779,210 | 10/1988 | Katsura et al. | 364/521 |
| 4,786,894 | 11/1988 | Furusawa et al. | 340/709 |

Primary Examiner—Gary V. Harkcom
Assistant Examiner—H. R. Herndon
Attorney, Agent, or Firm—Wenderoth, Lind & Ponack

[57] ABSTRACT

In sequential processings of converting input picture data springs having unitary picture data in succession to picture data of a form adapted for displaying, storing the resultant picture data and then displaying the same in a display, a first detection data and a second detection data are monitored. The first detection data is indicative of commencement of the unitary picture data and is detected from the input picture data strings. The second detection data is indicative of termination of the conversion and is detected on the unitary picture data basis. If the second detection data has not been detected at the time when the first detection data has been detected, the unitary picture data detected with the first detection data is invalidated and the unitary picture data is left unprocessed. If the second detection data has been detected at the time when the first detection data has detected, the unitary picture data detected with the first detection data is transferred to a subsequent stage for implementing a subsequent processing with respect to the unitary picture data. As such, even if the picture data is inputted independently of a processing ability of a picture data processing apparatus, the data can be processed and outputted in conformity with the processing ability of the apparatus.

5 Claims, 5 Drawing Sheets

CD-ROM DISK

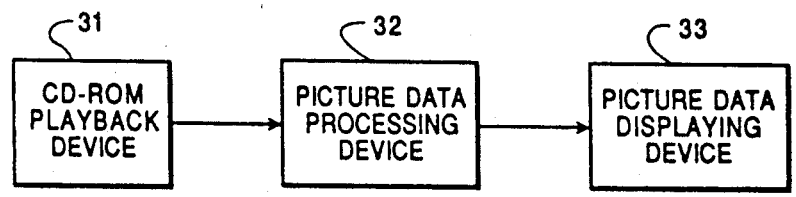
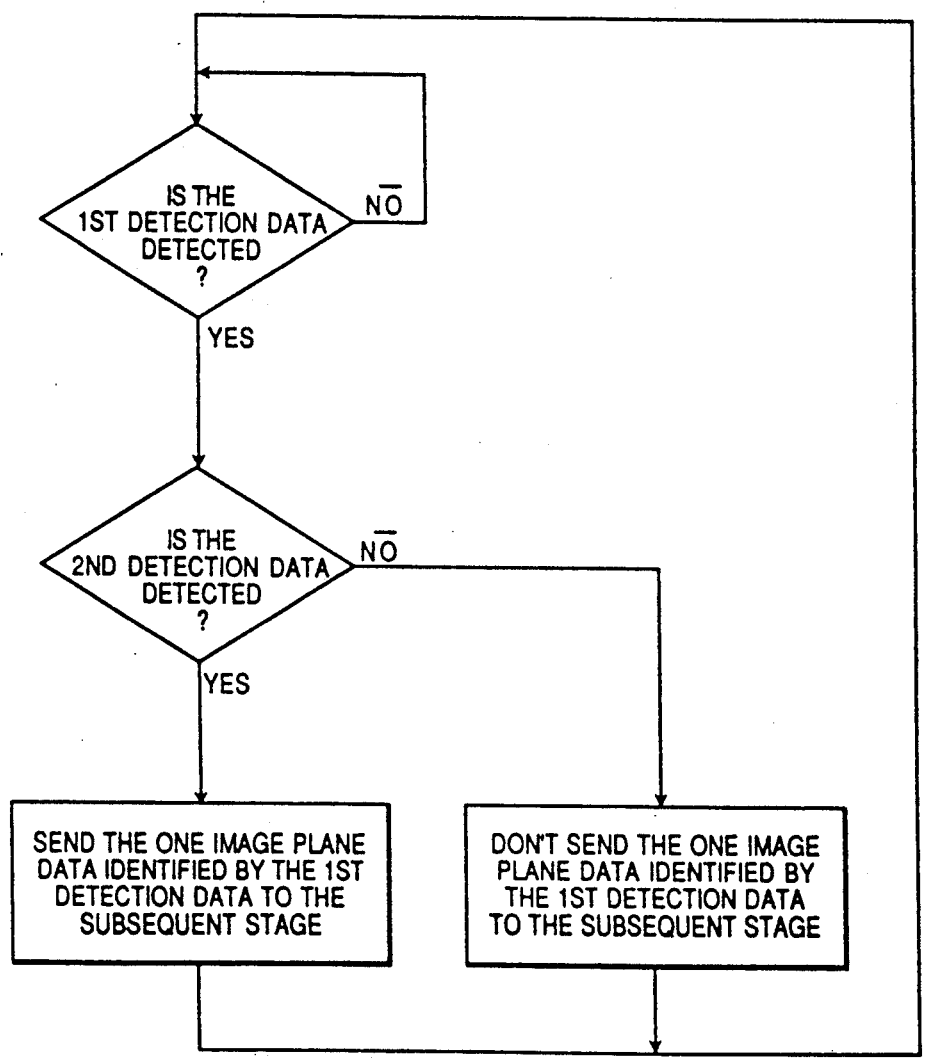

APPARATUS FOR PROCESSING CONTINUOUSLY INPUTTED PICTURE DATA STRINGS

BACKGROUND OF THE INVENTION

1. Field of the Invention

The present invention relates to a method and apparatus for processing picture data, in which processed are picture data strings of continuously occurring picture data.

2. Description of the Prior Art

Recently, due to availability of low-priced, high-capacity semiconductor memories and appearance of large capacity storage mediums, such as optical disk, it has become possible to easily deal with a large amount of digital data, especially picture data.

A prior art picture data processing apparatus will be described with reference to the drawings. FIG. 10 is a block diagram showing a prior art picture data processing apparatus, and FIG. 11 is an illustrative diagram showing picture data string inputted to the apparatus shown in FIG. 10. The apparatus in FIG. 10 comprises a temporary memory unit 101, an arithmetic unit 102, a display memory unit 103 for use in conjunction with a display, and a control unit 104. In FIG. 11, each data of the picture data strings 111 is made up of a leading data 112 and a picture data 113.

The apparatus thus arranged operates as follows. The picture data strings illustrated in FIG. 11 are entered into the temporary memory unit 101. It should be noted that due to difference in data structure, the picture data strings stored, for example, in a disk-like storage medium cannot be displayed on an image plane if such picture data are directly sent to the display memory unit 103. It is therefore necessary to convert the picture data to a data having a structure adapted for displaying. In the apparatus in FIG. 10, the data conversion is effected in the arithmetic unit 102, whereupon the resultant data is inputted to the display memory unit 103 and then outputted to the image plane. The arithmetic operation is effected on image plane basis. To this effect, the leading data 112 is used to recognize the picture data 113 for one image plane. Such processings are carried out under control of the control unit 104.

In the prior art picture data processing apparatus, the processings cannot be implemented in the case when one image plane data conversion time is longer than a period of time during which one image plane data is inputted to the temporary memory unit 101. As a rule, the processings cannot be implemented in the case when one unitary picture data conversion time is larger than a period of time during which the unitary picture data is inputted to the temporary memory unit. That is, a problem exists in that the operation cannot be performed in the case where the control unit is incapable of controlling the input of the picture data strings. This may occur when the picture data strings recorded in a compact disk which is generally used for recording and playing back audio information is intended to be sequentially played back.

SUMMARY OF THE INVENTION

In view of the foregoing, it is an object of the present invention to provide a method and apparatus for processing picture data, in which picture data can be processed depending upon the processing ability of the apparatus even in the case where the picture data are inputted independently of the processing ability of the apparatus.

In order to attain the above object, the present invention provides a method of processing picture data including the steps of converting input picture data strings having unitary picture data in succession to a picture data of a form adapted for displaying, storing the resultant picture data and then displaying the same in a display, the method comprising the steps of:

monitoring a first detection data and a second detection data, the first detection data being indicative of commencement of the unitary picture data and being detected from the input picture data strings, and the second detection data being indicative of termination of the conversion and being detected on the unitary picture data basis; and if the second detection data has not been detected at the time when the first detection data has detected, invalidating the unitary picture data detected with the first detection data and leaving the unitary picture data unprocessed, and if the second detection data has been detected at the time when the first detection data has detected, transferring the unitary picture data detected with the first detection data to a subsequent stage for implementing a subsequent processing with respect to the unitary picture data.

According to another aspect of the present invention, there is provided an apparatus for processing picture data for processing input picture data strings having unitary picture data in suooession, the apparatus comprising:

commencement data detecting means for detecting commencement of the unitary picture data from the input picture data strings and providing a first detection data;

gate means for controlling transferring of the unitary picture data with the commencement data detected by the detecting means;

first memory means for temporarily storing the unitary picture data transferred by the gate means arithmetic means for converting the unitary picture data stored in the first memory means to a data of a form adapted for displaying and outputting the resultant data;

second memory means for storing the data outputted from the arithmetic means to display the same termination data detecting means for detecting termination of conversion of the unitary picture data by the arithmetic means and providing a second detection data; and control means, upon receipt of the first detection data and the second detection data, for controlling the gate means to selectively invalidate the unitary data with the commencement data detected by the detecting means or to store the same in the first memory means.

In accordance with the method and apparatus as described, the picture data strings inputted independently of the processing ability of the control means can be processed end outputted depending upon the processing ability of the apparatus. Further, the apparatus is advantageous in that it is capable of processing picture data entering at different speeds. The picture data processing apparatus according to the present invention is particularly advantageous when the picture data strings recorded in a compact disk is played back and processed.

BRIEF DESCRIPTION OF THE DRAWINGS

FIG. 3 is a block diagram showing an arrangement of a system which stores, processes, and displays the picture data;

FIG. 5 is a flow chart for explaining the processings of a control unit shown in FIG 1;

DESCRIPTION OF THE PREFERRED EMBODIMENTS

A picture data processing apparatus according to one embodiment of the present invention will now be described with reference to FIGS. 1 through 5.

Figure 1:
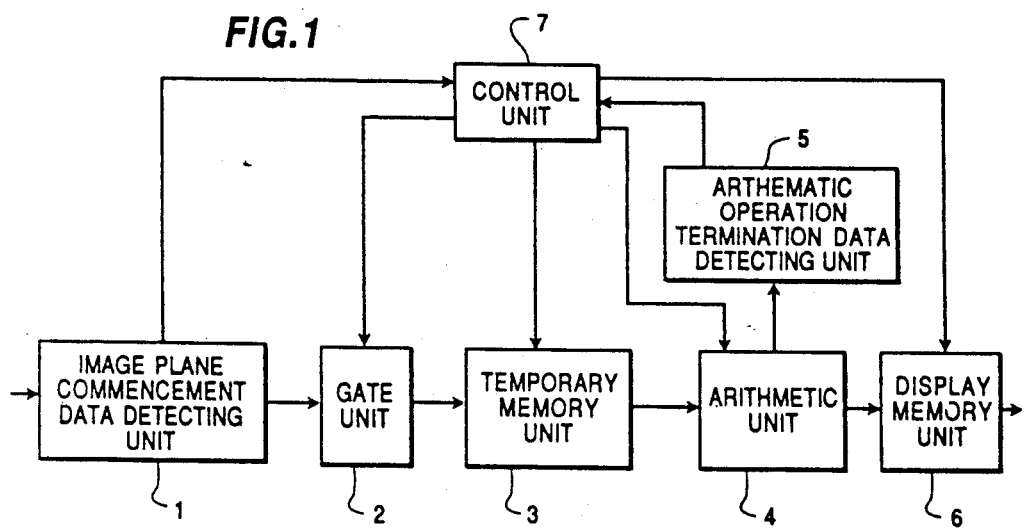
FIG 1 is a block diagram showing an arrangement of a picture data processing apparatus according to the present invention, in which one image plane data is designed to be a unitary picture data.
Figure 2A:
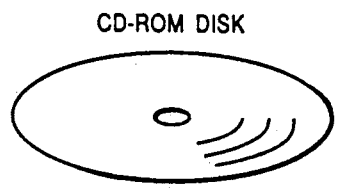
FIGS. 2(a)–(d) show a status of storage of the picture data.
Figure 2B:
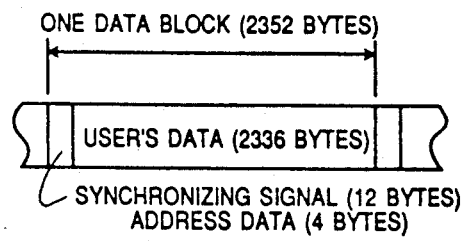
Figure 2D:
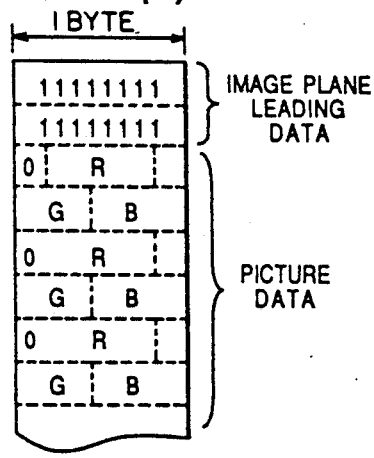
Figure 2C:
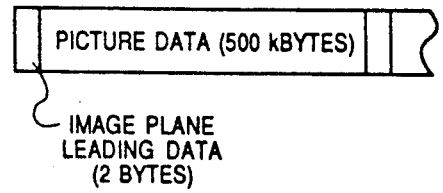
Figure 4:
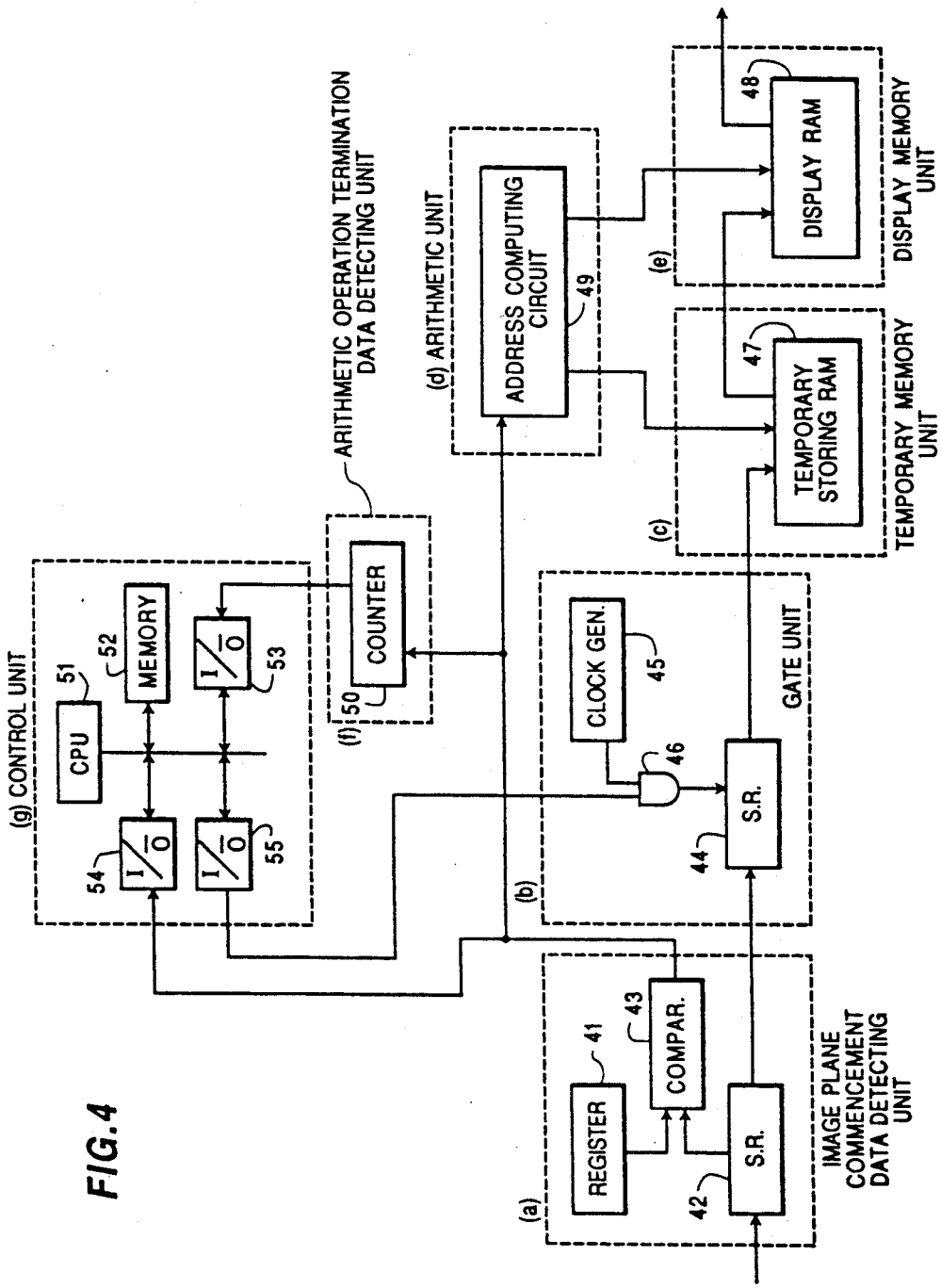
FIG. 4 is a block diagram showing a detailed arrangement of the apparatus shown in FIG. 1.

FIG. 1 is a block diagram showing an arrangement of the picture data processing apparatus according to the invention, in which one image plane data is designed as a unitary picture data. The arrangement in FIG. i includes an image plane commencement data detecting unit 1, a gate unit 2, a temporary memory unit 3, an arithmetic unit 4, an arithmetic operation termination data detecting unit 5, a display memory unit 6 for use in conjunction with a display, and a control unit FIG. 2 is an illustrative diagram showing picture data strings inputted to the apparatus shown in FIG. 1, in which FIG. 2(a) shows a schematic diagram showing a CD-ROM disk in which stored picture data strings are recorded, FIGS. 2(b) and 2(c) are illustrative diagrams showing the picture data strings, and FIG. 2(d) is a diagram showing a bit pattern of the picture data string. FIG. 3 is a block diagram showing an arrangement of a system which stores, processes, and displays the picture data, in which included are a CD-ROM playback device 31, a picture data processing device 32 and a picture data displaying device 33. FIG. 4 is a detailed block diagram showing the picture data processing apparatus shown in FIG. 1. The arrangement in FIG. 4 includes a register 41, a shift register 42, a comparator 43, a shift register 44, a clock generator 45, an AND circuit 46, a temporary storing RAM 47, a display RAM 48, an address computing circuit 49, a counter 50, a CPU 51, a memory 52, and I/0 ports 53, 54, 55. FIG. 5 is a flow chart for explaining the processing of the control device shown in FIG. 1.

Operation will next be described. According to this embodiment, one image plane data is designed as a unitary picture data and the picture data strings are recorded in the CD-ROM (Compact Disc-Read Only Memory) disk shown in FIG. 2(a). In the CD-ROM disk, digital data are recorded in place of pieces of music as normally recorded therein. As shown in FIG. 2(b), the digital data has a structure such that 2352-byte data are combined as one data block, and the one data block is composed of 12-byte synchronizing signal, 4-byte address data, and 2336-byte user's data region. In this embodiment, the picture data strings are recorded in the user's data region, and a structure of such picture data strings is as shown in FIG. 2(c). The unitary picture data is made up of image plane leading data and one image plane picture data. FIG. 2(d) illustrates a bit pattern of the unitary picture data, in which the image plane leading data is made up of 2-byte data of all "1". One pixel of the picture data is represented by 2-byte, in which 5-bit data is allocated to each of red (R), green (G) and blue (B) with one bit of "0" at the leading portion. Accordingly, the data for one image plane including 512×400 pixels contains 500 kilobyte data.

FIG. 3 is a system for displaying a picture recorded in the CD-ROM disk. The CD-ROM disk playback device 31 plays back the picture data strings from the CD-ROM disk, the resultant data is processed in the picture data processing device 32, and the data being processed is outputted to the picture data displaying device 33, such as a CRT display.

Operations performed in the picture data processing device 32 will be described. When the picture data strings as shown in FIG. 2 is inputted to the picture data processing device shown in FIG. 1, it is temporarily stored in the temporary memory unit 3 and is converted to a proper form in the arithmetic unit 4, and is then sent to the memory unit 6 in the similar fashion as in the prior art apparatus. It is now assumed that the unitary picture data stored in the temporary memory unit 3 has been subjected to conversion in the arithmetic unit 4 and the resultant data is transferred to the memory unit 6. At this time, when the subsequent one image plane picture data is inputted to the picture data processing apparatus, the input of such data is detected by the image plane commencement data detecting unit 1. This can be implemented by detecting the bit pattern of the leading data shown in FIG. 2(d). To be more specific, as shown in block (a) of FIG. 4, while storing the bit pattern of the leading data in the register 41, the input picture data is stored in the shift resister 42 to compare it with &he leading data in the resister 41, whereby input of the subsequent image plane picture data is detected. On the other hand, termination of conversion of the one image plane picture data is monitored by the arithmetic operation termination data detecting unit 5. This can be easily achieved, since the amount of the data for one image plane is known in advance. As shown in the block (f) in FIG. 4, this is implemented in such a manner that while resetting the counter 50 in response to the image plane commencement signal fed from the comparator 43, the amount of data for one image plane is counted up.

Based on a first detection data supplied from the image plane commencement data detecting unit 1 and a second detection data supplied from the arithmetic operation termination data detecting unit 5, the control unit 7 executes processings in accordance with the flow chart shown in FIG. 5. Specifically, the occurrence of the first detection data is being monitored, and when the second detection data has been detected at the time when the first detection data has detected, the one image plane data as identified by the first detection data is sent to the temporary memory unit 3 while controlling the gate unit 2. When the second detection data has not yet been detected, that data is not sent to the temporary memory unit 3 while controlling the gate unit 2 and is made invalid. The control unit 7 corresponds in FIG. 4 to the block (g) where the CPU 51 implements a program stored in the memory 52 in which the above-described processing contents are incorporated. Reading of the detection data into the CPU 51 and output of a control signal from the CPU 51 to the gate unit are carried out through the I/0 ports 53, 54 and 55. The gate unit 2 is implemented by the block (b) in FIG. 4 in which shift clocks to the shift register 44 are applied from the clock generator 45 through the AND circuit 46 which is controlled by the CPU 51. As such, transfer of the picture data to the subsequent stage is controllable by the CPU 51. The temporary memory unit 3 is implemented by the temporary storing RAM 47 in FIG. 4, and the display memory unit 6 by the display RAM 48 in FIG. 4. The arithmetic unit 4 is implemented by the address computing circuit 49 in FIG. 4 in which one pixel data of 2-bytes is read out of the temporary storing RAM 47, rearranged to 5-bit data corresponding to each of red, green and blue, and those are stored in prescribed address locations of the display RAM 48.

As described, according to this embodiment, the commencement of the picture data and conversion operation are monitored on one image plane basis, and the image data inputted during the arithmetic operation is made invalid. Therefore, the operation of the apparatus is ensured even if the data are inputted in excess of processing ability of the apparatus.

Although blocks (a), (b), (d) and (f) in FIG. 4 corresponding respectively to the image plane commencement data detecting unit, the gate unit, the arithmetic unit and the arithmetic operation termination data detecting unit are hardware arrangements, these units can also be implemented with software.

Figure 6:
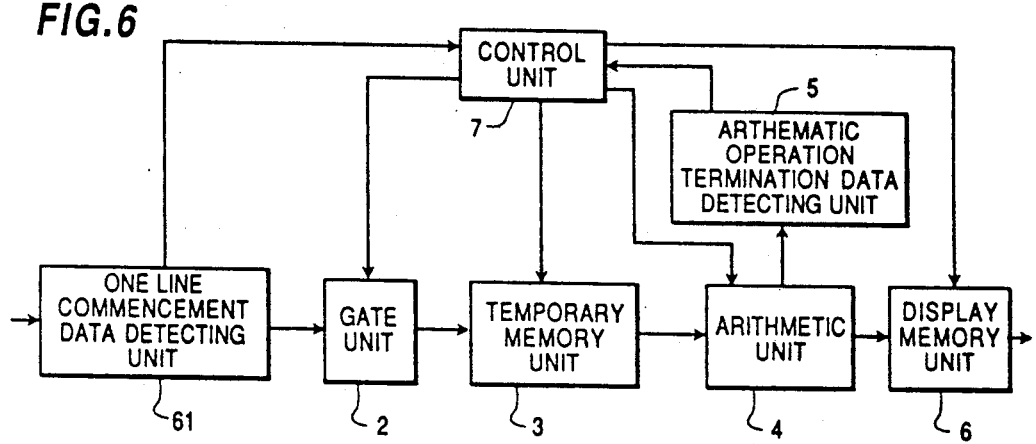
FIG. 6 is a block diagram showing a picture data processing apparatus according to the present invention, in which one line data is designed to be a unitary picture data.

In the above embodiment, one image plane data is designed as a unitary picture data. FIG. 6 is a block diagram showing a picture data processing apparatus according to the invention in which one line data is designed as the unitary picture data. Operation of the apparatus is similar to the above except that commencement of the one line data is detected by a one line commencement data detecting unit 61. In this case when the picture data is made invalid, it is possible to substitute the invalid data with the preceding one line data.

Figure 7:
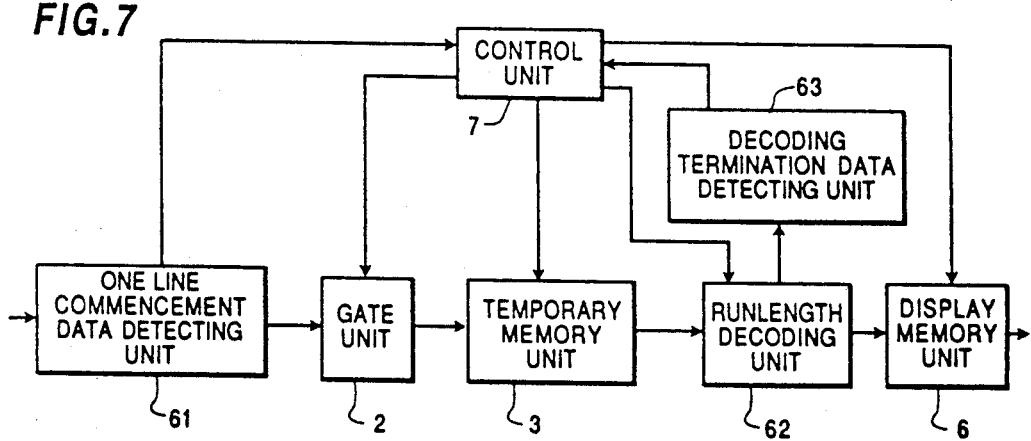
FIG. 7 is a block diagram showing an arrangement of a picture data processing apparatus according to the present invention, in which one line of runlength coded picture data is designed to be a unitary picture data.
Figure 9:
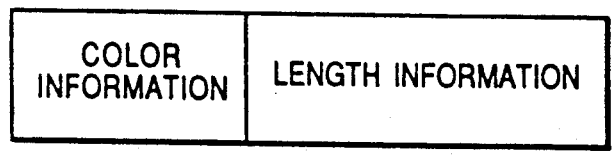
FIG. 9 is an illustrative diagram showing a structure of a runlength coded picture data.
Figure 10:
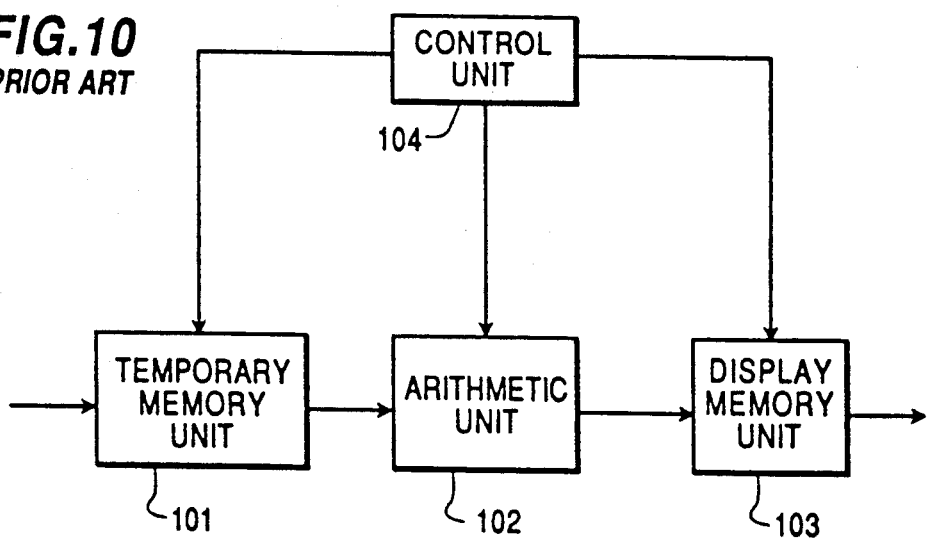
FIG. 10 is a block diagram showing an arrangement of a conventional picture data processing apparatus for processing picture data.
Figure 11:
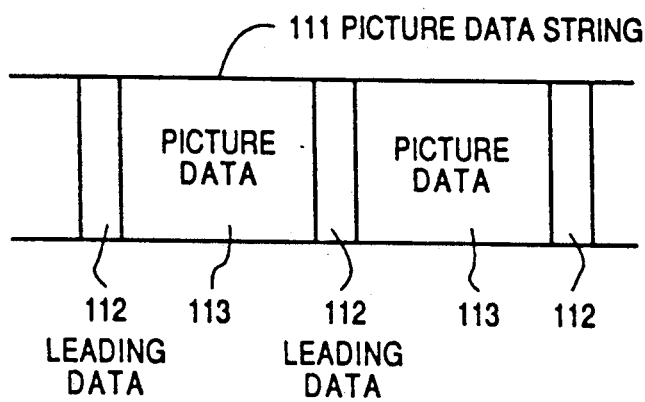
FIG. 11 is an illustrative diagram showing picture data strings inputted to the apparatus shown in FIG. 10.

Another embodiment will next be described in which the picture data is of runlength coding. In runlength coding, successive picture elements of the same color are subjected to encoding, and as shown in FIG. 9, the color information and the length information are encoded. FIG. 7 is a block diagram showing the picture data processing apparatus according to the invention, in which the picture data are of runlength coding and one line data is designed as the unitary picture data. In this case, the arithmetic unit is replaced by a runlength decoding unit 62, and the arithmetic operation termination data detecting unit by a decoding termination data detecting unit 63. The operation of the apparatus is similar to that shown in FIG. 6.

Figure 8:
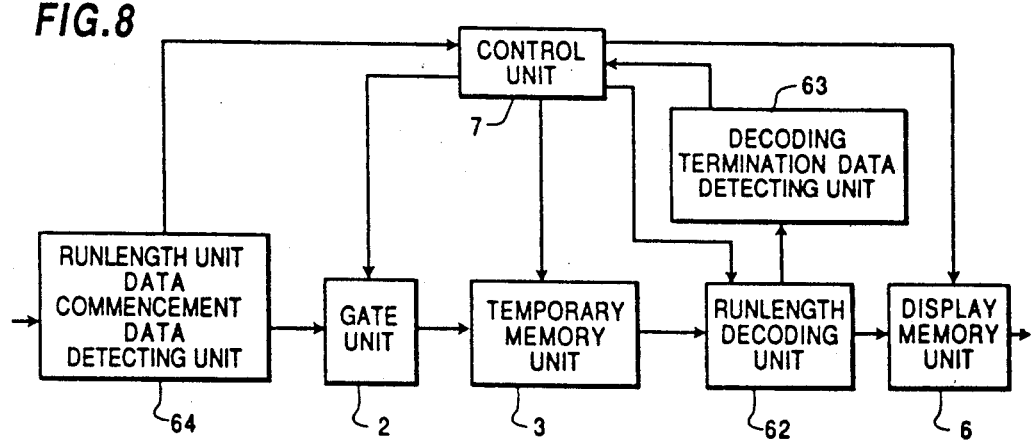
FIG. 8 is a block diagram showing an arrangement of a picture data processing apparatus according to the present invention, in which a runlength unit of runlength coded picture data is designed to be a unitary picture data.

FIG. 8 is a block diagram showing a picture data processing apparatus according to the invention in which the runlength unit data is designed as the unitary picture data. The runlength unit data bas a variable length in which detection of commencement of the unitary data is carried out by a runlength unit data commencement data detecting unit 64. The processings of the data can also be similarly executed.

Although various unitary data are exemplified, it would be apparent to those skilled in the art that the method and apparatus according to the invention are generally applicable to a unitary data defined as desired.

What is claimed is:

1. An apparatus for processing continuously inputted picture data strings, each of the data strings being composed of successively occurring unitary picture data, and each of the unitary picture data having a commencement data indicative of commencement of the unitary picture data, said apparatus comprising:

first detecting means for detecting said commencement data of each unitary picture data from said input picture data strings and providing a first detection data indicative of the detection of said commencement data;

gate means for controlling transferring of said unitary picture data whose commencement data has been detected by said first detecting means;

first memory means for temporarily storing said unitary picture data transferred by said gate means;

arithmetic means for converting said unitary picture data stored in said memory means to a data of a form adapted for displaying and outputting the resultant data;

second memory means for storing said data outputted from said arithmetic means;

display means for displaying said data stored in said second memory means;

second detecting means for detecting termination of a conversion of said unitary picture data by said arithmetic means and providing a second detection data indicative of the detection of the termination of the conversion; and control means responsive to said first detection data and said second detection data for controlling said gate means to operate such that said unitary data whose commencement data has been detected by said first detecting means is transferred through said gate means when said first detection data has occurred subsequent to an occurrence of said second detection data and is not transferred through said gate means when no second detection data has occurred prior to an occurrence of said first detection data.

2. The apparatus according to claim 1, wherein said unitary picture data amounts to a single image plane of said display means.

3. The apparatus according to claim 1, wherein said unitary picture data amounts to a single line, and wherein when no second detection data has occurred prior to an occurrence of said first detection data, said control means controls said second memory means such that a one line preceding picture data which has been subjected to arithmetic operation by said arithmetic means id duplicated in said second memory means to provide the same data as the one line preceding data.

4. The apparatus according to claim 3, wherein said picture data is a string of runlength coded data in which color information representing a color and length information representing a length of the color information are coded.

5. The apparatus according to claim 1, wherein said picture data is a string of runlength coded data in which color information representing a color and length information representing a length of the color information are coded and said unitary picture data amounts to one said runlength coded data.

* * * * *